(12) United States Patent
Watanabe

(10) Patent No.: US 11,843,264 B2
(45) Date of Patent: Dec. 12, 2023

(54) NON-CONTACT CHARGING SYSTEM

(71) Applicant: HONDA MOTOR CO., LTD., Tokyo (JP)

(72) Inventor: Yu Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 17/189,408

(22) Filed: Mar. 2, 2021

(65) Prior Publication Data
US 2021/0281121 A1 Sep. 9, 2021

(30) Foreign Application Priority Data

Mar. 6, 2020 (JP) .................... 2020-039406

(51) Int. Cl.
| | |
|---|---|
| H02J 50/60 | (2016.01) |
| H02J 7/02 | (2016.01) |
| B60L 53/124 | (2019.01) |
| H02J 50/10 | (2016.01) |
| H02J 50/40 | (2016.01) |
| H02J 50/80 | (2016.01) |

(52) U.S. Cl.
CPC ............ *H02J 50/60* (2016.02); *B60L 53/124* (2019.02); *H02J 7/02* (2013.01); *H02J 50/10* (2016.02); *H02J 50/402* (2020.01); *H02J 50/80* (2016.02)

(58) Field of Classification Search
CPC ...................................... H02J 50/60
USPC ........................................ 320/108
See application file for complete search history.

(56) References Cited

U.S. PATENT DOCUMENTS

| | | | |
|---|---|---|---|
| 10,938,241 B2 * | 3/2021 | Park ................. | H04N 21/47217 |
| 2016/0322868 A1 | 11/2016 | Akuzawa et al. | |
| 2020/0119579 A1 * | 4/2020 | Niwa ................... | H04B 5/0037 |

FOREIGN PATENT DOCUMENTS

| | | | | |
|---|---|---|---|---|
| JP | 2012-257404 A | | 12/2012 | |
| JP | 5258521 B2 | | 8/2013 | |
| JP | 2015-025742 A | | 2/2015 | |
| JP | 2017-135843 A | | 8/2017 | |
| JP | 207135843 | * | 8/2017 | ............. H02J 50/60 |
| JP | 2020-61902 A | | 4/2020 | |
| WO | 2015/097807 A1 | | 7/2015 | |

OTHER PUBLICATIONS

Office Action dated Dec. 7, 2021, issued in counterpart JP application No. 2020-039406, with English translation. (4 pages).

* cited by examiner

*Primary Examiner* — Edward Tso
*Assistant Examiner* — Ahmed H Omar
(74) *Attorney, Agent, or Firm* — WHDA, LLP

(57) ABSTRACT

Power transmission to a power reception unit that is performed by a power transmission unit and, in turn, non-contact charging of a battery mounted on a vehicle are suspended on the condition that the existence of a foreign object is detected around the power transmission unit. A designated period that is a suspension period of power transmission performed by the power transmission unit is set to vary in accordance with the type of a foreign object, that is, in the present embodiment, depending on whether a foreign object is a metal piece or an object containing metal (first foreign object) or a living body (second foreign object).

9 Claims, 3 Drawing Sheets

NON-CONTACT CHARGING SYSTEM

CROSS REFERENCES TO RELATED APPLICATIONS

The present application claims priority under 35 U.S.C. § 119 to Japanese Patent Application No. 2020-039406, filed Mar. 6, 2020, entitled "Non-contact charging System." The contents of this application are incorporated herein by reference in their entirety.

TECHNICAL FIELD

The present disclosure relates to a system that charges a vehicle-mounted battery in a non-contact manner.

BACKGROUND

There has been proposed a technique for temporarily stopping power transmission when a person or a foreign object is detected by a change in power transmission efficiency and resuming transmission of a small amount of power after elapse of a predetermined period of time in a power transfer system (see, for example, Japanese Patent No. 5258521).

There has been proposed a technique for detecting the intensity of reflected waves from a foreign object so as to determine the type of the foreign object (a moving object when the intensity fluctuates in a large range, and a stationary object when the intensity fluctuates in a small range) in a foreign-object detection device (see, for example, Japanese Unexamined Patent Application Publication No. 2015-025742).

SUMMARY

However, when a foreign object is detected at the time of non-contact charging of a battery that is mounted on a vehicle, the charging needs to be stopped. After the charging has been stopped, if the charging is resumed too early, it is very likely that the foreign object will be still exist near a power transmission unit and will hinder the charging.

The present application describes, for example, a system capable of suitably controlling a suspension period of power transmission performed by a power transmission unit when the existence of a foreign object is detected around the power transmission unit.

One aspect of a non-contact charging system according to an aspect of the present disclosure includes a power transmission unit that transmits power in a non-contact manner to a power reception unit mounted on a vehicle in order to charge a battery mounted on the vehicle, a charging control device that controls an amount of power transmitted by the power transmission unit, and a foreign-object detection unit that detects an existence and a type of a foreign object existing around the power transmission unit. On a condition that the foreign-object detection unit detects the existence and the type of a foreign object during a period when the power transmission unit transmits power to the power reception unit, the charging control device suspends power transmission performed by the power transmission unit for a designated period that varies in accordance with the type of the foreign object.

According to the non-contact charging system having the above-described configuration, on the condition that the existence of a foreign object is detected around the power transmission unit (including above of the power transmission unit and the right and left side of the power transmission unit), power transmission to the power reception unit, which is mounted on the vehicle, by the power transmission unit and, in turn, non-contact charging of the battery mounted on the vehicle are suspended. In addition, a suspension period of power transmission performed by the power transmission unit is set to vary in accordance with the type of a foreign object. As a result, in view of the fact that the length of time taken to displace or remove the foreign object from the vicinity of the power transmission unit varies in accordance with the type of the foreign object (e.g., a moving object or a stationary object), a reduction in the probability of a suspension period of non-contact charging of the vehicle-mounted battery becoming excessively short or excessively long is achieved.

In the non-contact charging system, it is preferable that the charging control device cause the power transmission unit to resume power transmission on a condition that the existence of a foreign object is not detected by the foreign-object detection unit when the designated period has elapsed after the power transmission unit has stopped power transmission.

According to the non-contact charging system having the above-described configuration, when the designated period has elapsed after the power transmission unit has stopped power transmission in response to detection of the existence of a foreign object around the power transmission unit, power transmission performed by the power transmission unit and, in turn, charging of the vehicle-mounted battery are resumed after it is confirmed that no foreign object is exist around the power transmission unit. Thus, when the designated period has elapsed after the power transmission unit has stopped power transmission, heat generation or the like of the power transmission unit due to a foreign object existing around the power transmission unit may be avoided with certainty.

In the non-contact charging system, it is preferable that the charging control device suspend power transmission performed by the power transmission unit for a new designated period according to the type of the foreign object in response to the foreign-object detection unit detecting the existence and the type of a foreign object when the designated period has been elapsed after the power transmission unit has stopped power transmission.

According to the non-contact charging system having the above-described configuration, when the designated period has elapsed after the power transmission unit has stopped power transmission in response to detection of the existence of a foreign object around the power transmission unit, the power transmission unit continues to stop power transmission in response to confirmation of the existence of a foreign object around the power transmission unit. When it takes an unexpectedly long time for the foreign object existing around the power transmission unit to be removed or become no longer exist, the timing at which charging is resumed may be postponed. Therefore, when the designated period has elapsed after the power transmission unit has stopped power transmission, heat generation or the like of the power transmission unit due to a foreign object existing around the power transmission unit may be avoided with certainty.

In the non-contact charging system, it is preferable that the charging control device issue a notification prompting removal of the foreign object to a user of the vehicle via an external terminal when power transmission performed by the power transmission unit is suspended for the new designated period.

According to the non-contact charging system having the above-described configuration, a notification prompting removal of the foreign object is issued to the user only when power transmission performed by the power transmission unit is continuously stopped for a period longer than the original designated period. As a result, the frequency of unnecessary notifications for prompting the user to remove a foreign object that exists around the power transmission unit may be reduced.

In the non-contact charging system, it is preferable that the foreign-object detection unit include a metal detector that detects an existence of an object containing metal as a foreign object existing above the power transmission unit and a living-body detector that detects an existence of a living body as a foreign object existing around the power transmission unit, and it is preferable that the charging control device set the designated period in accordance with an output signal from the metal detector and an output signal from the living-body detector.

According to the non-contact charging system having the above-described configuration, by using the different detectors that detect the existence of an object containing metal (a first foreign object) and the existence of a living body (a second foreign object), respectively, the type of a foreign object that exists around the power transmission unit may be detected with high accuracy. Thus, from the standpoint of avoiding heat generation of the power transmission unit due to a metal-containing body existing above the power transmission unit, the designated period may be suitably set. In addition, from the standpoint of avoiding a living body that exists around the power transmission unit from being exposed to electromagnetic waves emitted by the power transmission unit, the designated period may be suitably set.

In the non-contact charging system, it is preferable that the metal detector include a coil array that is embedded in a sheet-shaped member included in the power transmission unit, and it is preferable that the living-body detector include a plurality of ultrasonic sensors that are arranged on a peripheral edge portion of the sheet-shaped member in such a manner as to have different directivities.

According to the non-contact charging system having the above-described configuration, the size of an object containing metal is detected by the coil array (formed of a plurality of coils arranged in a predetermined manner), which is included in the metal detector, and thus, the type of the object may be detected with high accuracy. The plurality of an ultrasonic sensors, which is included in the living-body detector, detect whether a living body moves toward or away from the power transmission unit. Thus, from the standpoint of avoiding heat generation of the power transmission unit due to a metal-containing body existing above the power transmission unit, the designated period may be suitably set. In addition, from the standpoint of avoiding a living body that exists around the power transmission unit from being exposed to electromagnetic waves emitted by the power transmission unit, the designated period may be suitably set.

BRIEF DESCRIPTION OF THE DRAWINGS

The advantages of the disclosure will become apparent in the following description taken in conjunction with the following drawings.

DESCRIPTION OF THE PREFERRED EMBODIMENTS (Configuration)
(Configuration of Non-Contact Charging System)

Figure 1:
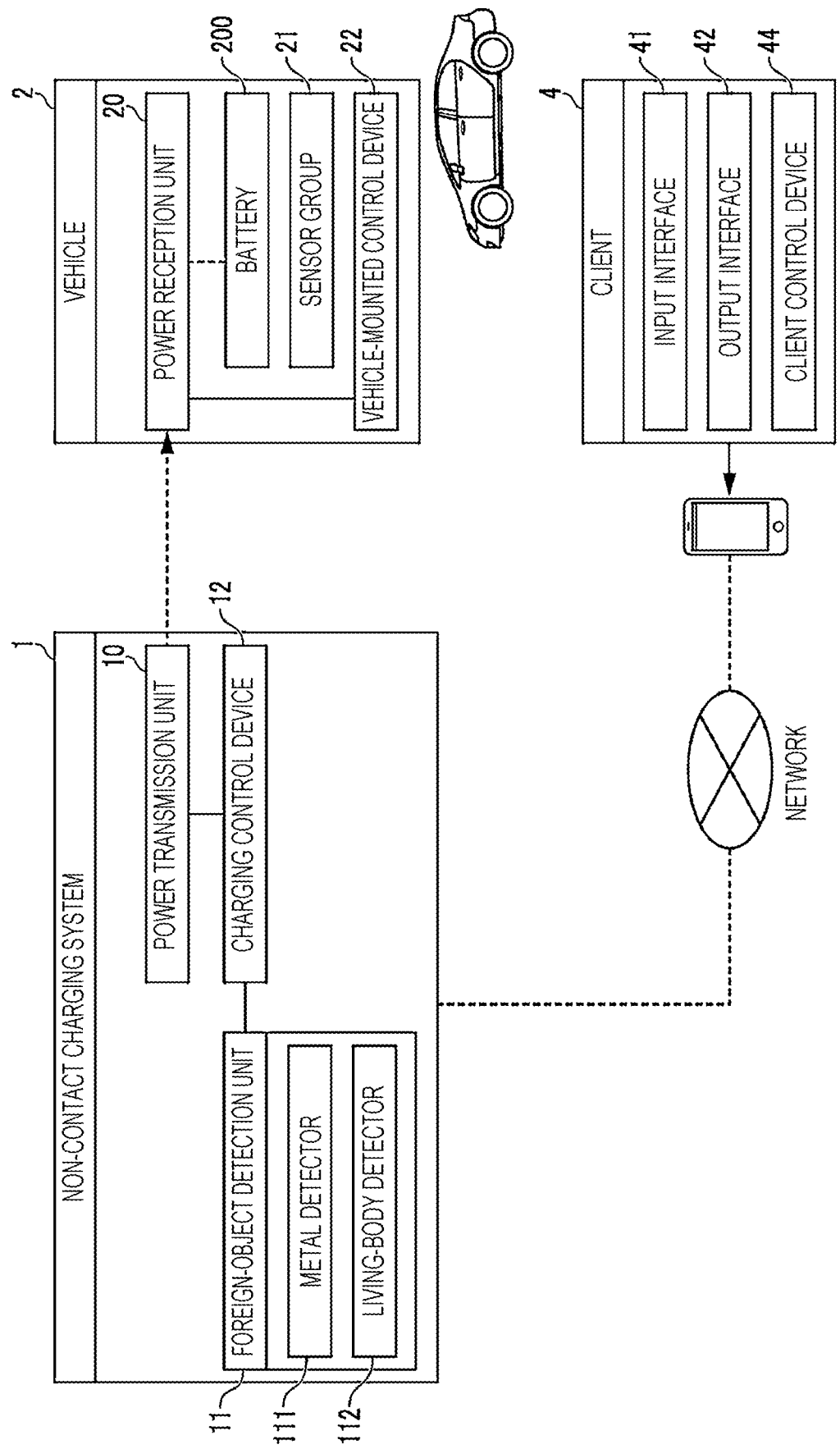
FIG. 1 is a diagram relating to a configuration of a non-contact charging system according to an embodiment of the present disclosure.

A non-contact charging system 1 according to an embodiment of the present disclosure that is illustrated in FIG. 1 includes a power transmission unit 10, a foreign-object detection unit 11, and a charging control device 12. The non-contact charging system 1 has a function of communicating with a vehicle 2 and a client 4. The communication method between the non-contact charging system 1 and the vehicle 2 and the communication method between the non-contact charging system 1 and the client 4 may be the same as or different from each other.

The power transmission unit 10 transmits power in a non-contact manner to a power reception unit 20 that is mounted on the vehicle 2 in order to charge a battery 200 that is mounted on the vehicle 2. For example, the power transmission unit 10 is installed in a parking space of the vehicle 2.

The foreign-object detection unit 11 includes a metal detector 111 and a living-body detector 112 that are arranged around or in the vicinity of the power transmission unit 10.

Figure 2:
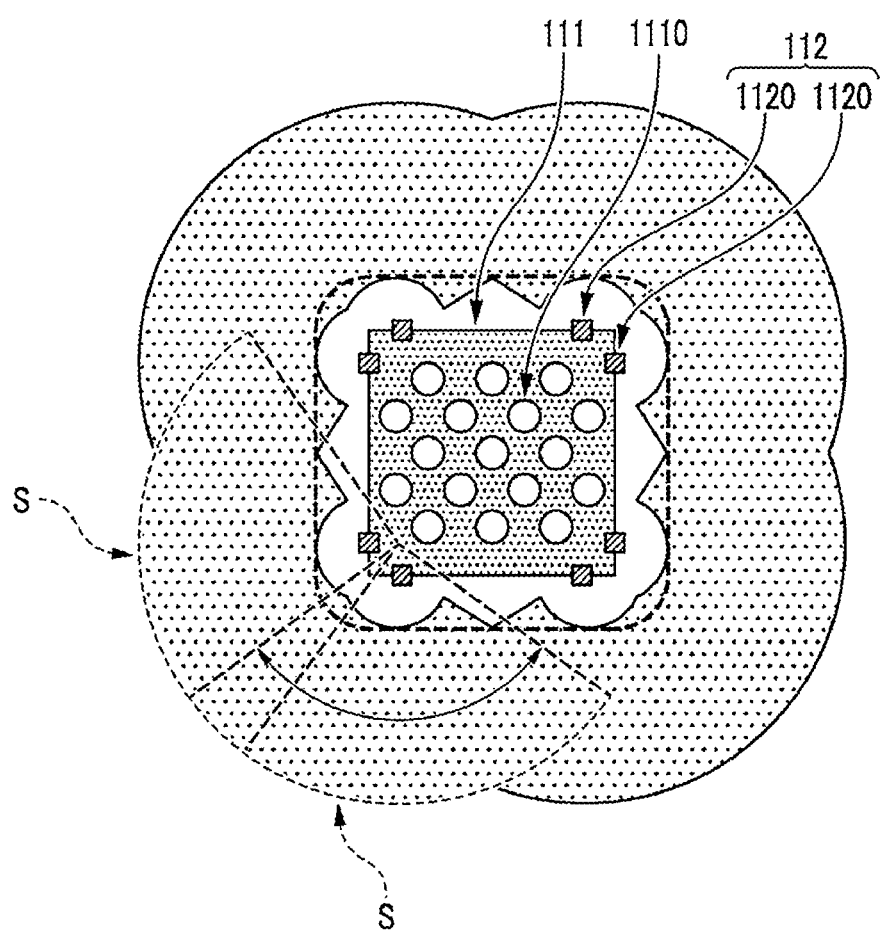
FIG. 2 is a diagram relating to a configuration of a foreign-object detection unit.

As illustrated in FIG. 2 as an example, the metal detector 111 includes a coil array formed of a plurality of coils 1110 that are disposed in a distributed manner along an approximate plane, and a portion of or the entire coil array is embedded in a resin pad that is included in the power transmission unit 10. The metal detector 111 detects the existence or nonexistence and the position of a metal piece above the power transmission unit 10 on the basis of how a signal having an oscillatory waveform that is supplied to each of the plurality of coils 1110 from an oscillator changes. The size of an object containing metal is detected by the coil array included in the metal detector 111, and thus, the type of the object may be detected with high accuracy.

The living-body detector 112 includes, for example, a plurality of ultrasonic sensors 1120. As illustrated in FIG. 2, the plurality of ultrasonic sensors 1120 are arranged at different positions on a peripheral edge portion of the resin pad, which is included in the power transmission unit 10. A region S that is detectable by the living-body detector 112 and that is illustrated in FIG. 2 has a three-dimensional shape such as that obtained by rotating a fan-like shape about an axis that passes through the living-body detector 112. The living-body detector 112 detects the existence or nonexistence and the position of a living body around the power transmission unit 10 on the basis of an output signal from each of the plurality of ultrasonic sensors 1120. The plurality of ultrasonic sensors 1120 included in the living-body detector 112 detect whether a living body moves toward or away from the power transmission unit 10.

The charging control device 12 controls a power transmission operation of the power transmission unit 10 on the basis of the existence and the type of a foreign object detected by the foreign-object detection unit 11.

The charging control device 12 includes a storage device (e.g., an HDD, a memory or an SSD formed thereof, or the like) and an arithmetic processing unit (e.g., a CPU, a single-core processor, a multicore processor, or the like) that reads necessary data and a necessary program (software)

from the storage device and executes arithmetic processing on the data in accordance with the program.

(Configuration of Vehicle)

The vehicle 2 illustrated in FIG. 1 includes the power reception unit 20, a sensor group 21, a vehicle-mounted control device 22, and the battery 200.

In order to charge the battery 200, the power reception unit 20 receives power in a non-contact manner from the power transmission unit 10 that is installed at a designated location. The battery 200 is formed of, for example, a lithium-ion secondary battery. The vehicle-mounted control device 22 suitably controls the operation of each component of the vehicle 2 in accordance with output signals from various sensors included in the sensor group 21.

Similar to the charging control device 12, the vehicle-mounted control device 22 includes a storage device (e.g., an HDD, a memory or an SSD formed thereof, or the like) and an arithmetic processing unit (e.g., a CPU, a single-core processor, a multicore processor, or the like) that reads necessary data and a necessary program (software) from the storage device and executes arithmetic processing on the data in accordance with the program.

(Configuration of Client)

The client 4 is a terminal apparatus such as a smartphone, a tablet terminal, or a personal computer and includes an input interface 41, an output interface 42, and a client control device 44. The input interface 41 includes a touch-screen button, a touch-screen switch, and the like. The output interface 42 includes an image output device and a wireless communication device. The client control device 44 is formed of an arithmetic processing unit (a single-core processor, a multicore processor, or a processor core included therein), and the client control device 44 reads necessary data and necessary software from a storage device such as a memory and executes arithmetic processing on the data in accordance with the software.

(Function)

An embodiment of a function of the non-contact charging system 1 having the above-described configuration will now be described with reference to the flowchart illustrated in FIG. 3. The non-contact charging system 1 exhibits this function after communication between the non-contact charging system 1 and the vehicle 2 has been established as a result of the vehicle 2 approaching its parking space, and the vehicle 2 has been parked at a suitable position in the parking space.

Figure 3:
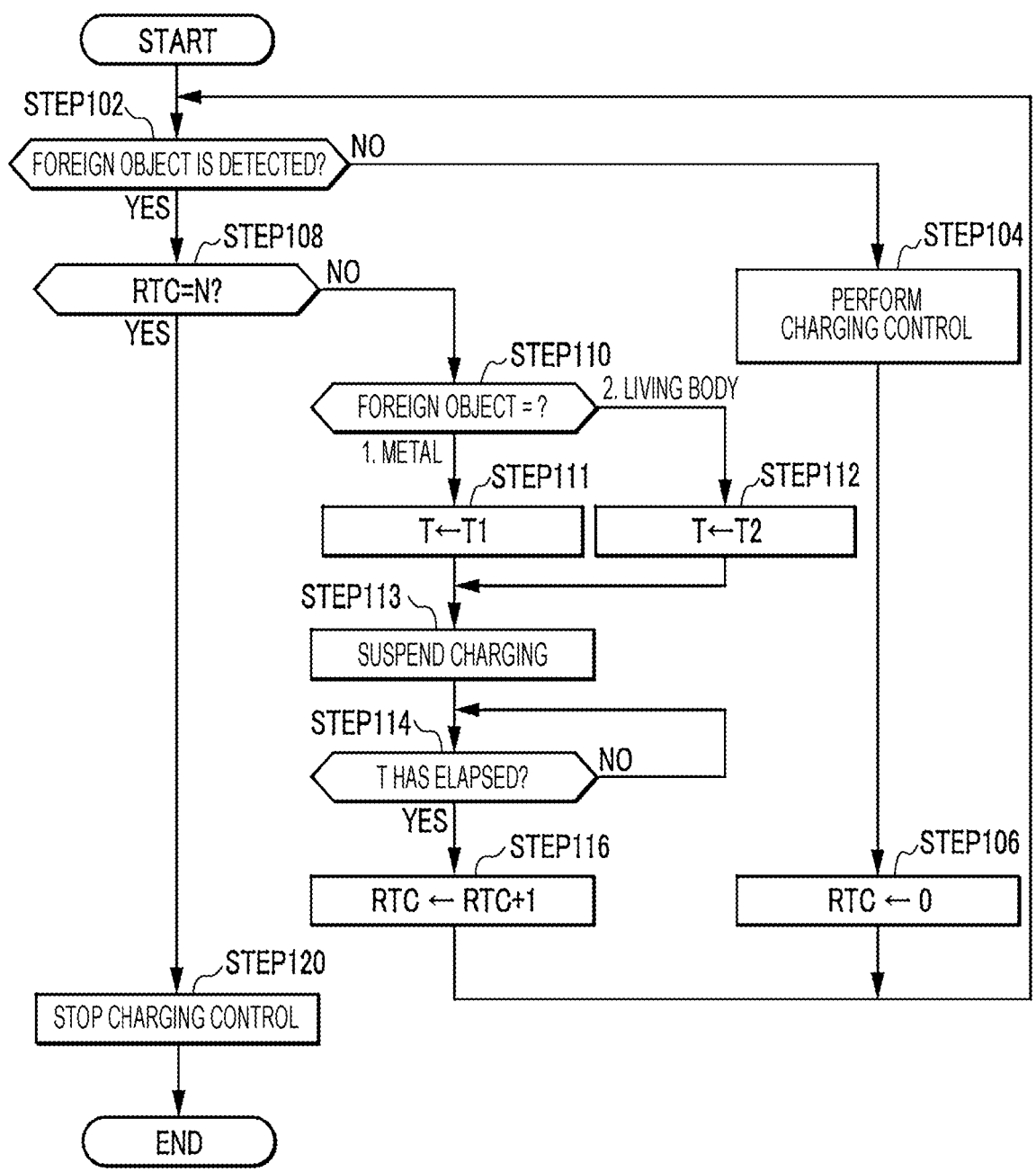
FIG. 3 is a flowchart relating to a function of the non-contact charging system according to the embodiment of the present disclosure.

First, the charging control device 12 determines whether the foreign-object detection unit 11 has detected the existence of a foreign object around or in the vicinity of the power transmission unit 10 (STEP 102 in FIG. 3).

When it is determined that the existence of a foreign object around or in the vicinity of the power transmission unit 10 is not detected by the foreign-object detection unit 11 (NO in STEP 102 in FIG. 3), the charging control device 12 performs control processing for charging the battery 200 of the vehicle 2 (STEP 104 in FIG. 3). Power transmission to the power reception unit 20 and, in turn, charging of the battery 200 of the vehicle 2 is started or continued by the power transmission unit 10. In this case, an index RTC indicating the number of attempts to charge the battery 200, which is mounted on the vehicle 2, is set to or maintained at "0" (STEP 106 in FIG. 3). Then, the processing operations that are performed after the determination as to whether the foreign-object detection unit 11 has detected the existence of a foreign object around or in the vicinity of the power transmission unit 10 (STEP 102 in FIG. 3) are repeated.

When it is determined that the foreign-object detection unit 11 has detected the existence of a foreign object around or in the vicinity of the power transmission unit 10 (YES in STEP 102 in FIG. 3), it is determined whether the index RTC has reached a designated value N (STEP 108 in FIG. 3).

When it is determined that the index RTC does not reach the designated value N (NO in STEP 108 in FIG. 3), the charging control device 12 determines the type of the foreign object whose existence is detected around the power transmission unit 10 (STEP 110 in FIG. 3). More specifically, it is determined whether the existence of a metal piece or an object containing metal (a first foreign object) is detected above or in the vicinity of the power transmission unit 10 by using the metal detector 111 or the existence of a living body such as a hand or leg of a human being (a second foreign object) is detected around the power transmission unit 10 by using the living-body detector 112.

When the foreign object whose existence is detected around the power transmission unit 10 is determined to be the first foreign object, which is a metal piece or an object containing metal (1 in STEP 110 in FIG. 3), a designated period T is set to a first designated period T1 (STEP 111 in FIG. 3). When the foreign object whose existence is detected around the power transmission unit 10 is determined to be the second foreign object, which is a living body (2 in STEP 110 in FIG. 3), the designated period T is set to a second designated period T2 (STEP 112 in FIG. 3). The first designated period T1 may be longer or shorter than the second designated period T2.

The charging control device 12 suspends the power transmission performed by the power transmission unit 10, and in turn, the charging of the battery 200 (STEP 113 in FIG. 3). Then, it is determined whether the designated period T has elapsed (STEP 114 in FIG. 3).

When it is determined that the designated period T has not been elapsed (NO in STEP 114 in FIG. 3), it is determined whether the designated period T has elapsed (STEP 114 in FIG. 3). As a result, the state in which the power transmission performed by the power transmission unit 10 and the charging of the battery 200 of the vehicle 2 are stopped for the designated period T is maintained. On the other hand, when it is determined that the designated period T has elapsed (YES in STEP 114 in FIG. 3), the index RTC is incremented by "1" (STEP 116 in FIG. 3). Then, the processing operations that are performed after the determination as to whether the foreign-object detection unit 11 has detected the existence of a foreign object around or in the vicinity of the power transmission unit 10 (STEP 102 in FIG. 3) are repeated.

When it is determined that the index RTC has reached the designated value N (YES in STEP 108 in FIG. 3), the charging control device 12 stops the control processing for charging the battery 200 of the vehicle 2 (STEP 120 in FIG. 3).

Advantageous Effects

According to the non-contact charging system 1, which has the above-described configuration, power transmission to the power reception unit 20 performed by the power transmission unit 10 and, in turn, non-contact charging of the battery 200, which is mounted on the vehicle 2, are suspended on the condition that the existence of a foreign object is detected around the power transmission unit 10 (see YES in STEP 102, . . . , STEP 113 in FIG. 3). In addition, the designated period T that is a suspension period of power transmission performed by the power transmission unit 10 is set to vary in accordance with the type of a foreign object, that is, in the present embodiment, depending on whether a foreign object is the first foreign object, which is a metal piece or an object containing metal or the second foreign object, which is a living body (see 1 in STEP 110 to STEP 111 and 2 in STEP 110 to STEP 112 in FIG. 3).

By using the different detectors 111 and 112 that detect the existence of an object containing metal (first foreign object) and the existence of a living body (second foreign object), respectively, the type of a foreign object that exists around the power transmission unit 10 may be detected with high accuracy (see FIG. 2). Thus, from the standpoint of avoiding heat generation of the power transmission unit 10 due to a metal-containing body existing above the power transmission unit 10, the designated period T may be set to the suitable first designated period T1 (see 1 in STEP 110 to STEP 111 in FIG. 3). In addition, from the standpoint of avoiding a living body that exists around the power transmission unit 10 from being exposed to electromagnetic waves from the power transmission unit 10, the designated period T may be set to the suitable second designated period T2 (see 2 in STEP 110 to STEP 112 in FIG. 3).

As a result, in view of the fact that the length of time taken to displace or remove a foreign object from the vicinity of the power transmission unit 10 varies in accordance with the type of the foreign object (e.g., a moving object or a stationary object), a reduction in the probability of the suspension period of non-contact charging of the battery 200 becoming excessively short or excessively long is achieved (see YES in STEP 102, . . . , STEP 113 in FIG. 3).

When the designated period T has elapsed after the power transmission unit 10 has stopped power transmission, the power transmission performed by the power transmission unit 10 is resumed on the condition that the foreign-object detection unit 11 does not detect the existence of a foreign object (see YES in STEP 114, . . . , NO in STEP 102, STEP 104 in FIG. 3). Thus, when the designated period T has elapsed after the power transmission unit 10 has stopped power transmission, heat generation or the like of the power transmission unit 10 due to a foreign object existing around the power transmission unit 10 may be avoided with certainty.

In the case where the designated value N is 2 or greater, in response to the foreign-object detection unit 11 detecting the existence and the type of a foreign object when the designated period T has elapsed after the power transmission unit 10 has stopped power transmission, power transmission performed by the power transmission unit 10 is suspended for a new designated period T according to the type of the foreign object (see YES in STEP 114, . . . , YES in STEP 102, NO in STEP 108, 1 in STEP 110, STEP 111 in FIG. 3 or see YES in STEP 114, . . . , YES in STEP 102, NO in STEP 108, 2 in STEP 110, STEP 112, STEP 113 in FIG. 3). Accordingly, when it takes an unexpectedly long time for the foreign object existing around the power transmission unit 10 to be removed or become no longer exist, the timing at which charging of the battery 200 is resumed can be postponed. Therefore, when the designated period T has elapsed after the power transmission unit 10 has stopped power transmission, heat generation or the like of the power transmission unit 10 due to a foreign object existing around the power transmission unit 10 may be avoided with certainty.

Another Embodiment of Present Disclosure

When power transmission performed by the power transmission unit 10 is suspended for the new designated period T, the charging control device 12 may issue a notification prompting removal of a foreign object to a user of the vehicle 2 via the client 4 (an external terminal) on the basis of communication with the client 4. As a result, a notification such as "Charging cannot be performed due to a foreign object in the parking space. Please remove the foreign object." is output to the output interface 42 by the client control device 44.

According to the non-contact charging system 1, which has the above-described configuration, a notification prompting removal of a foreign object is issued to a user only when power transmission performed by the power transmission unit 10 is continuously stopped for a period longer than the original designated period T (see YES in STEP 114, . . . , YES in STEP 102 in FIG. 3). As a result, the frequency of unnecessary notifications for prompting the user to remove a foreign object that exists around the power transmission unit 10 may be reduced.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A non-contact charging system comprising:
a power transmission unit that transmits power in a non-contact manner to a power reception unit mounted on a vehicle in order to charge a battery mounted on the vehicle;
a charging control device that controls an amount of power transmitted by the power transmission unit; and
a foreign-object detector that detects an existence of a foreign object existing around the power transmission unit and a type of the foreign object,
wherein, the charging control device:
on a condition that the foreign-object detector detects the existence and the type of the foreign object when the power transmission unit transmits power to the power reception unit, suspends power transmission performed by the power transmission unit for a designated period that varies in accordance with the type of the foreign object,
when it is determined that the designated period has elapsed after the power transmission is suspended, changes an index value which indicates the number of trial of power charging, and sets a new designated period according to the type of the foreign object in response to the foreign-object detector detecting the existence and the type of a foreign object, and
determines whether the index value has reached a predesignated value, and when it is determined that the index value has reached the predesignated value, stops a control processing for charging the battery of the vehicle.

2. The non-contact charging system according to claim 1, wherein the charging control device causes the power transmission unit to resume power transmission on a condition that the existence of the foreign object is not detected by the foreign-object detector when the designated period has elapsed after the power transmission is suspended.

3. The non-contact charging system according to claim 1,
wherein the charging control device issues a notification prompting removal of the foreign object to a user of the vehicle via an external terminal when power transmission performed by the power transmission unit is suspended for the new designated period.

4. The non-contact charging system according to claim 1,
wherein the foreign-object detector includes
a metal detector that detects an existence of an object containing metal as the foreign object existing above the power transmission unit and
a living-body detector that detects an existence of a living body as the foreign object existing around the power transmission unit, and
wherein the charging control device sets the designated period in accordance with an output signal from the metal detector and an output signal from the living-body detector.

5. The non-contact charging system according to claim 4,
wherein the metal detector includes a coil array that is embedded in a sheet-shaped member included in the power transmission unit, and
wherein the living-body detector includes a plurality of ultrasonic sensors that are arranged on a peripheral edge portion of the sheet-shaped member in such a manner as to have different directivities, respectively.

6. The non-contact charging system according to claim 1,
wherein, when the designated period has elapsed after the power transmission is suspended, the foreign-object detector performs detection of the existence and the type of the foreign object, and
when the existence of the foreign object is detected, the charging control device suspends power transmission performed by the power transmission unit for the new designated period according to the type of the foreign object.

7. The non-contact charging system according to claim 3,
wherein the charging control device does note issue the notification prompting removal of the foreign object to the user of the vehicle via the external terminal until power transmission performed by the power transmission unit is suspended for the new designated period.

8. The non-contact charging system according to claim 5,
wherein the metal detector detects size of the object, and
the living-body detector detects whether a living body moves toward or away from the power transmission unit.

9. A non-contact charging method of a non-contact charging system which comprises a power transmission unit that transmits power in a non-contact manner to a power reception unit mounted on a vehicle in order to charge a battery mounted on the vehicle,
the method comprising the steps of:
detecting, by a foreign-object detector, an existence of a foreign object existing around the power transmission unit and a type of the foreign object,
wherein
on a condition that the existence and the type of the foreign object are detected when the power transmission unit transmits power to the power reception unit, suspending, by a computer, power transmission performed by the power transmission unit for a designated period that varies in accordance with the type of the foreign object,
when it is determined that the designated period has elapsed after the power transmission is suspended, changing an index value which indicates the number of trial of power charging, and setting a new designated period according to the type of the foreign object in response to the foreign-object detector detecting the existence and the type of a foreign object, and
determining whether the index value has reached a pre-designated value, and when it is determined that the index value has reached the predesignated value, stopping a control processing for charging the battery of the vehicle.

* * * * *